United States Patent [19]
Miyagosi et al.

[11] Patent Number: 6,047,027
[45] Date of Patent: Apr. 4, 2000

[54] PACKETIZED DATA STREAM DECODER USING TIMING INFORMATION EXTRACTION AND INSERTION

[75] Inventors: Eiji Miyagosi, Osaka; Akihiro Watabe, Nara-ken, both of Japan

[73] Assignee: Matsushita Electric Industrial Co., Ltd., Kadoma, Japan

[21] Appl. No.: 08/792,789

[22] Filed: Feb. 3, 1997

[30] Foreign Application Priority Data

Feb. 7, 1996 [JP] Japan .................................. 8-021551

[51] Int. Cl.[7] ........................................................ H04N 7/24
[52] U.S. Cl. ........................................ 375/240; 348/845.2
[58] Field of Search .................................... 348/384, 390, 348/845, 845.2, 423; 382/232, 233; 386/68, 81, 82, 111, 112; 375/246

[56] References Cited

U.S. PATENT DOCUMENTS

| | | | |
|---|---|---|---|
| 5,517,250 | 5/1996 | Hoogenboom | 348/390 |
| 5,644,310 | 7/1997 | Laczko, Sr. | 386/96 |
| 5,758,007 | 5/1998 | Kitamura | 386/109 |

FOREIGN PATENT DOCUMENTS

| | | |
|---|---|---|
| 0579075 | 1/1994 | European Pat. Off. . |
| 0730384 | 9/1996 | European Pat. Off. . |
| 6252876 | 9/1994 | Japan . |
| 6343065 | 12/1994 | Japan . |
| 730886 | 1/1995 | Japan . |

*Primary Examiner*—Bryan Tung
*Attorney, Agent, or Firm*—Renner, Otto, Boisselle, Sklar

[57] ABSTRACT

A decoding device and decoding method for decoding main video data, sub video data and audio data included in a bit stream. The decoding device includes a divider which divides the bit stream into a header and data. The device also includes an extractor and a formatter, the extractor extracts first timing information which defines timing for outputting the decoded signal from the header, and the formatter inserts the first timing information to a prescribed position of the data. The device further includes a decoder for decoding the data to generate the decoded signal, and an output controller for controlling timing for outputting the decoded signal based on second timing information which defines a reference for the timing for outputting the decoded signal and the first timing information inserted at the prescribed position of the data. The decoding method includes the steps of dividing the bit stream into a header and data, and extracting the first timing information from the header. The method also includes the steps of inserting the first timing information to a prescribed position of the data, decoding the data to generate the decoded signal; and controlling timing for outputting the decoded signal based on the second timing information and the first timing information inserted at the prescribed position of the data.

4 Claims, 15 Drawing Sheets

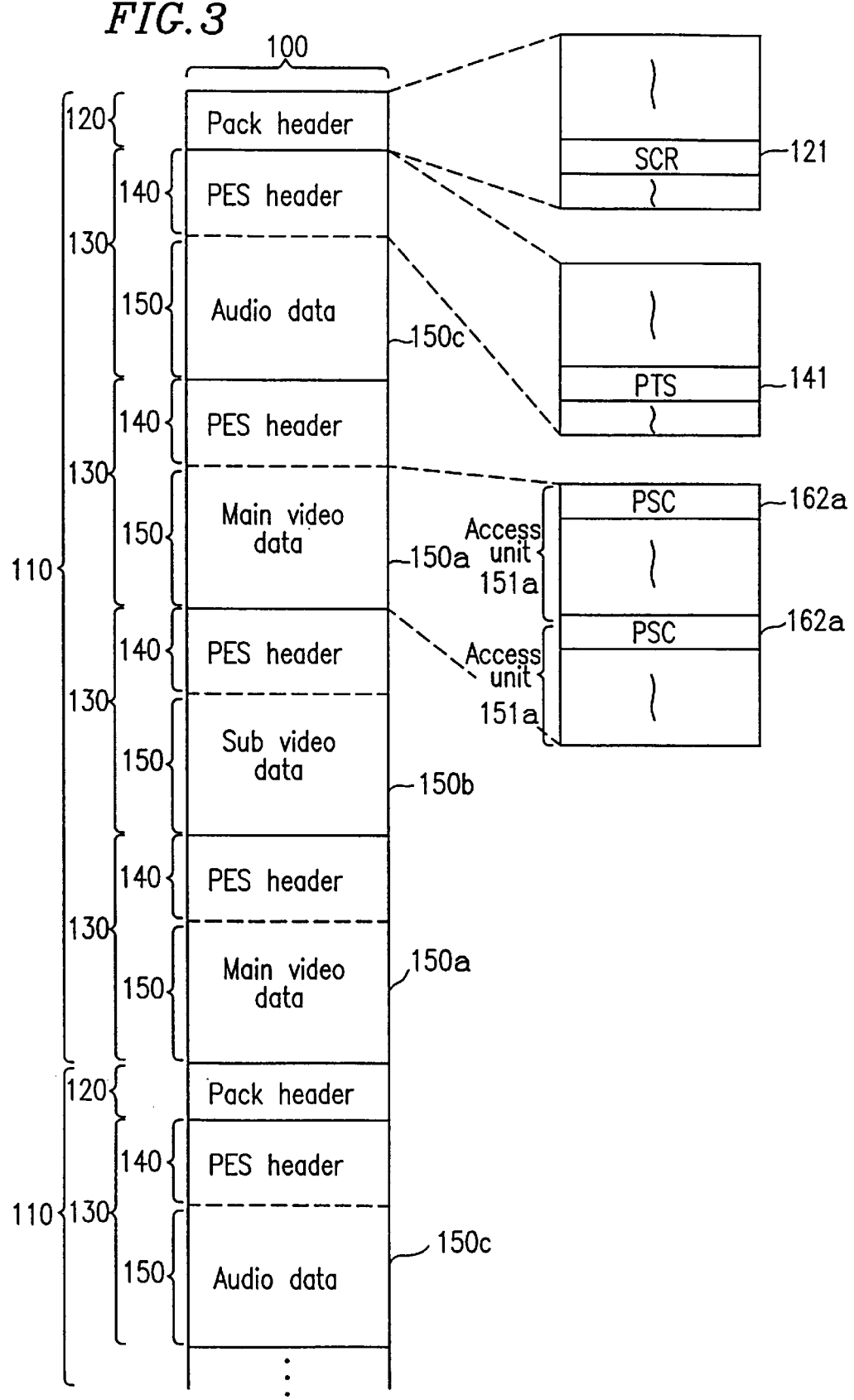

Syntax of pack header 120

```
Pack_header(){
    pack_start_code
    '01'
    system_clock_reference_base[32:30]
    marker_bit
    system_clock_reference_base[29:15]
    marker_bit
    system_clock_reference_base[14:0]
    marker_bit
    system_clock_reference_extension
    marker_bit
    program_mux_rate
    marker_bit
    marker_bit
    reserved
    pack_stuffing_length
    for(1=0;i<pack_stuffing_length;i++){
        stuffing_byte
    }
    if(nextbits()==system_header_start_code){
        system_header()
    }
}
```

Example of bit arrangement of pack header 120

Syntax of PES header 140

```
PES_packet(){
    packet_start_code_prefix
    stream_id
    PES_packet_length
    if(stream_id != program_stream_map
    && stream_id != padding_stream
    && stream_id != private_stream_2
    && stream_id != ECM
    && stream_id != EMM
    && stream_id != program_stream_directory){
        '10'
        PES_scrambling_control
        PES_priority
        data_alignment_indicator
        copyright
        PTS_DTS_flags

GO TO
        FIG. 4C
```

Example of bit arrangement of PES header 140

0000 0000 0000 0000 0000 0001
1110 0000
0000 0000 1111 1111

10
11
0
0
1
11

FIG. 4B

```
FROM
FIG. 4B
       PES_header_data_length
       if(PTS_DTS_flags=='10'){
           '0010'                            1000 0000
           PTS[32.30]
           marker_bit
           PTS[29.15]
           marker_bit
           PTS[14.0]
           marker_bit
       }
       if(PTS_DTS_flags=='11'){
           '0011"                            0011
           PTS[32.30]                        000
           marker_bit                        1
           PTS[29.15]                        0000 0000 0000 000
           marker_bit                        1
           PTS[14.0]                         1000 0000 0000 000
           marker_bit                        1
GO TO FIG. 4D
```

*FIG. 4C*

PACKETIZED DATA STREAM DECODER USING TIMING INFORMATION EXTRACTION AND INSERTION

BACKGROUND OF THE INVENTION

1. Field of the Invention

The present invention relates to a decoding device and a decoding method for decoding main video data, sub video data and audio data included in a bit stream.

2. Description of the Related Art

In known conventional decoding devices, signals are synchronized by storing a pack header or a PES header in a memory and then analyzing a system clock reference (SCR), a presentation time stamp (PTS) and the like using a CPU.

Such conventional decoding devices require the CPU to constantly update the correlation between the SCR and the PTS for managing the timing for outputting the decoded signals. This requirement complicates the control of the relationship between the CPU and the decoding device, consequently placing an excessive load on the CPU.

The conventional decoding apparatuses also disadvantageously require an excessively large amount of buffer memory.

SUMMARY OF THE INVENTION

According to one aspect of the present invention, a decoding device for decoding a bit stream and outputting a decoded signal includes a divider for dividing the bit stream into a header and data; an extractor for extracting first timing information, which defines timing for outputting the decoded signal from the header; a formatter for inserting the first timing information to a prescribed position of the data; a decoder for decoding the data to generate the decoded signal; and an output controller for controlling timing for outputting the decoded signal based on second timing information which defines a reference for the timing for outputting the decoded signal and the first timing information inserted at the prescribed position of the data.

In one embodiment of the invention, the data includes a plurality of data portions, and the formatter includes a selection circuit for selecting one of each of the plurality of data portions or the first timing information in response to a detection signal which specifies a prescribed data portion among the plurality of data portions.

In another embodiment of the invention, the data includes a plurality of data portions, and the formatter inserts an address pointer to a prescribed position of the data, the address pointer linking one of the plurality of data portions and another of the plurality of data portions in an addressable form.

In still another embodiment of the invention, the formatter includes a first selection circuit for selecting one of each of the plurality of data portions or the first timing information in response to a first detection signal which specifies a prescribed data portion among the plurality of data portions, a counter for counting an amount of data which passes through the formatter between the receipt of the first detection signal and the receipt of a second detection signal immediately after the first detection signal, and a second selection circuit for selecting one of an output from the first selection circuit or an output from the counter in response to the second detection signal.

In still another one embodiment of the invention, a decoding device further includes a reading control section for controlling reading of the data so as to skip at least a part of the plurality of data portions by referring to the address pointer in response to a control signal.

In still another embodiment of the invention, a decoding device further includes a reading control section for controlling reading of the data so as to repeatedly read at least a part of the plurality of data portions in response to a control signal.

In still another embodiment of the invention, a decoding device further includes a reading control section for controlling reading of the data so as to skip at least a part of the plurality of data portions by referring to the address pointer in accordance with a comparison result of the first timing information and the second timing information.

In still another embodiment of the invention, a decoding device further includes a reading control section for controlling reading of the data so as to repeatedly read at least a part of the plurality of data portion in accordance with a comparison result of the first timing information and the second timing information.

According to another aspect of the present invention, a decoding method for decoding a bit stream and outputting a decoded signal includes the steps of dividing the bit stream into a header and data; extracting first timing information, which defines timing for outputting the decoded signal, from the header; inserting the first timing information to a prescribed position of the data; decoding the data to generate the decoded signal; and controlling timing for outputting the decoded signal based on second timing information which defines a reference for the timing for outputting the decoded signal and the first timing information inserted at the prescribed position of the data.

Thus, the invention described herein makes possible the advantages of providing a decoding device which imposes only a relatively light load on the CPU and requires only a relatively small amount of buffer memory, and a decoding method for decoding signal using such a decoding device.

These and other advantages of the present invention will become apparent to those skilled in the art upon reading and understanding the following detailed description with reference to the accompanying figures.

BRIEF DESCRIPTION OF THE DRAWINGS

FIG. 3 is a schematic view of a bit stream to be input to the decoding device shown in FIG. 2;

FIG. 4A shows an example of a general syntax of a pack header and an example of a bit arrangement in accordance with the syntax; and FIG. 4B–4D show an example of a general syntax of a PES header and an example of a bit arrangement in accordance with the syntax;

DESCRIPTION OF THE PREFERRED EMBODIMENTS

Hereinafter, the present invention will be described by way of illustrative, but not limiting, examples with reference to the accompanying drawings.

EXAMPLE 1

Figure 1:
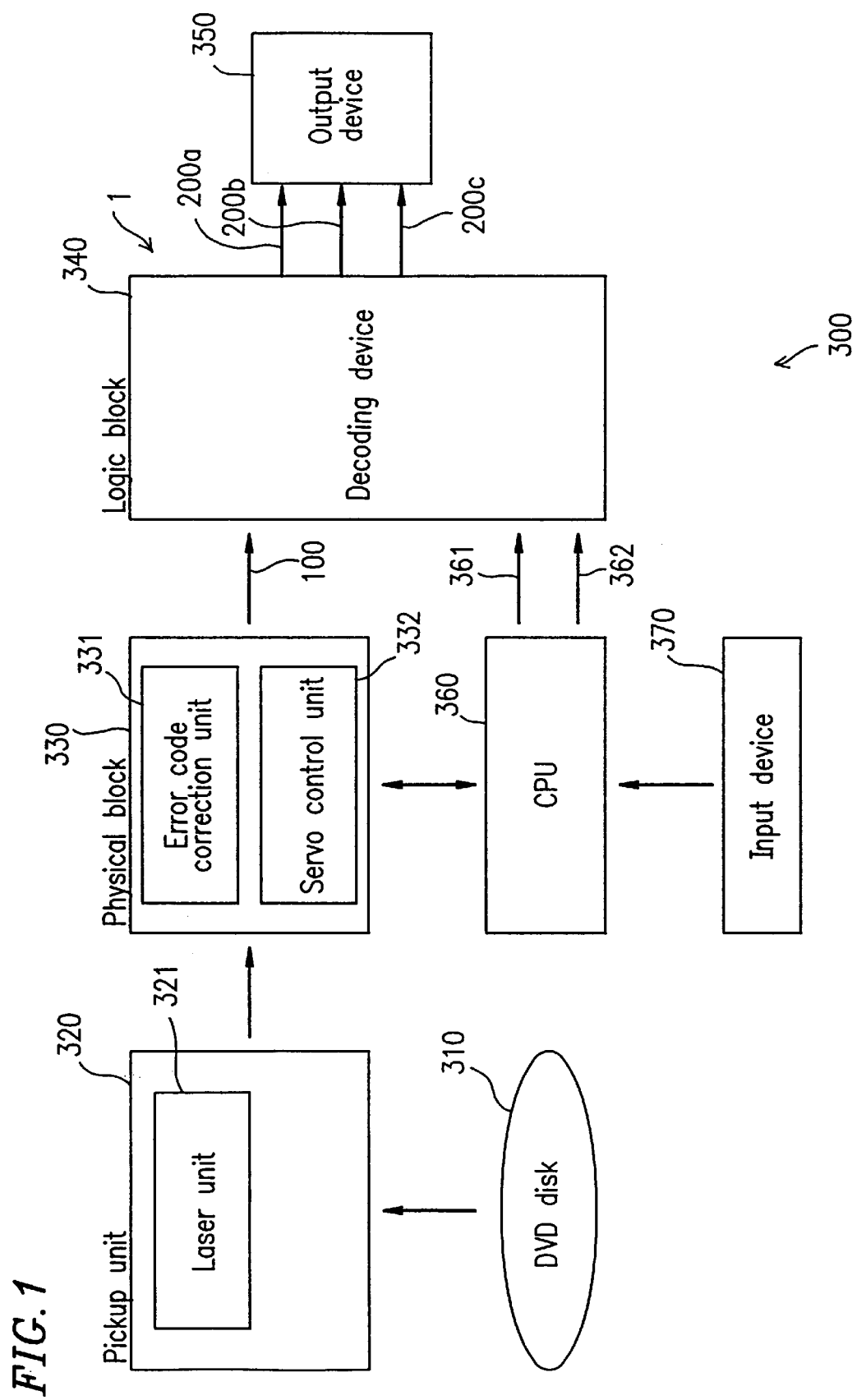
FIG. 1 is a block diagram of a DVD player including a decoding device according to the present invention.

FIG. 1 is a block diagram of a DVD player 300 including a decoding device 1 according to a first example of the present invention.

As shown in FIG. 1, the DVD player 300 includes a pickup unit 320 for reading data stored in a DVD disk 310, a physical block 330 for reproducing the read data to generate a bit stream 100, the decoding device 1 provided as a logic block 340 for decoding the bit stream 100 to output a main video signal 200$a$, a sub video signal 200$b$ and an audio signal 200$c$ to an output device 350, and a central processing unit (CPU) 360 for controlling the physical block 330 and the logic block 340.

The pickup unit 320 includes a laser unit 321 for radiating laser light having a prescribed wavelength to the DVD disk 310.

The physical block 330 includes an error code correction unit 331 and a servo control unit 332.

The DVD player 300 preferably operates in the following manner.

When a reproduction start instruction or a reproduction termination instruction is input from an input device 370 to the CPU 360, the CPU 360 outputs a control signal 361 indicating the start/termination of a reproduction operation to the decoding device 1. When an instruction which designates the reproduction mode (e.g., normal reproduction mode, double-speed reproduction mode or freeze reproduction mode) is input from the input device 370 to the CPU 360, the CPU 360 outputs a control signal 362 indicating the reproduction mode to the decoding device 1. Then, the decoding device 1 executes decoding in accordance with the control signals 361 and 362.

Figure 2:
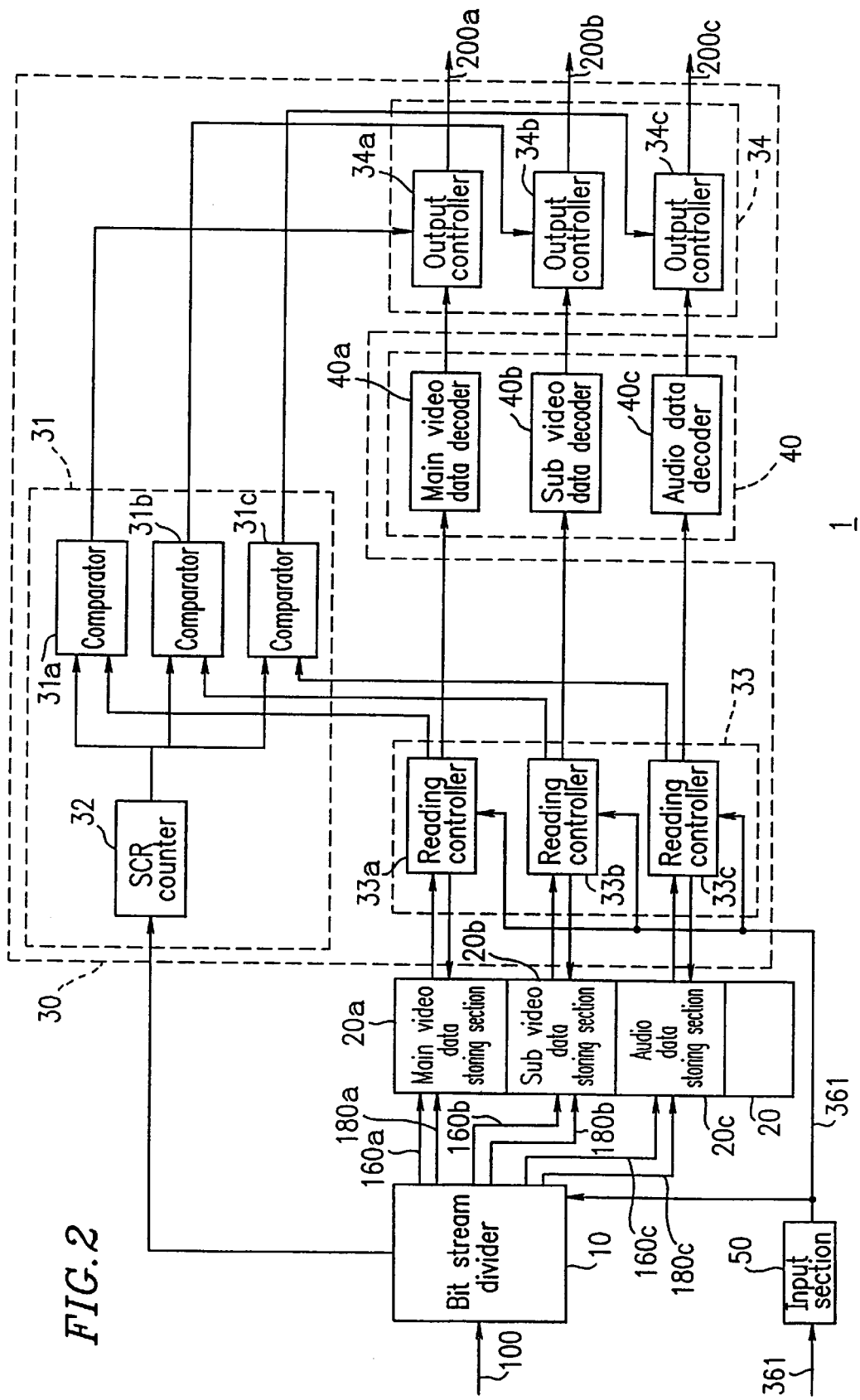
FIG. 2 is a circuit diagram illustrating a structure of a decoding device according to a first example of the present invention.

FIG. 2 is a circuit diagram illustrating a structure of the decoding device 1 according to the first example of the present invention. The decoding device 1 receives a bit stream 100, then divides the bit stream 100 into main video data, sub video data and audio data, and decodes the three types of data. Thus, the decoding device 1 outputs the main video signal 200$a$, the sub video signal 200$b$ and the audio signal 200$c$. Further details as to the structure of the decoding device 1 are presented below.

The bit stream 100 is input from data-storing media such as CD-ROMs, laser disks, videotapes or from broadcasting media such as conventional TV broadcasting, satellite broadcasting and data communication.

FIG. 3 schematically shows the bit stream 100 to be input to the decoding device 1. Although the bit stream 100 shown in FIG. 3 is in conformity with the MPEG2 standard, any bit stream which has substantially the same header and data as described below can be input to the decoding device 1.

As shown in FIG. 3, the bit stream 100 includes one or more packs 110 which are arranged along a time axis. Each pack 110 includes a pack header 120 and one or more packets 130. Each packet 130 includes a PES header 140 and data 150. The data 150 is either one of main video data 150$a$, sub video data 150$b$ or audio data 150$c$.

The main video data 150$a$ indicates main information included in video media such as movies and TV broadcasting. The sub video data 150$b$ indicates additional information in the above-mentioned video media, for example, titles and subtitles.

The pack header 120 includes an SCR (system clock reference) 121, which defines the reference for the timing for outputting decoded signals. In addition to the SCR 121, the pack header 120 includes a definition of the maximum input rate and a definition of the maximum buffer amount of the main video data, the sub video data, and the audio data.

The PES header 140 includes a PTS (presentation time stamp) 141, which defines the timing for outputting decoded signals. The timing defined by the PTS 141 is relative timing based on the reference defined by the SCR 121. In addition to the PTS 141, the PES header 140 includes a decoding time stamp (DTS), elementary stream clock reference (ESCR), a flag for trick play control and the like.

FIG. 4A shows an example of a general syntax of the pack header 120 and an example of a bit arrangement in accordance with the syntax. For example, a bit arrangement corresponding to a combination of three arrays: system_clock_reference_base [32:30], system_clock_reference_base [29:15], and system_clock_reference_base [14:0] corresponds to the SCR 121. In this example, the SCR 121 is 33-bit data.

Figure 4D:

FIG. 4B–4D show an example of a general syntax of the PES header 140 and an example of a bit arrangement in accordance with the syntax. For example, a bit arrangement corresponding to a combination of three arrays: PTS [32:30], PTS [29:15], and PTS [14:0] corresponds to the PTS 141. In this example, the PTS 141 is 33-bit data.

Returning to FIG. 2, the decoding device 1 includes a bit stream divider 10, a buffer memory 20, a control section 30 including a reading control section 33, and an elementary decoding section 40.

The control signal 361 indicating the start/termination of the reproduction operation is input to the bit stream divider 10 and also to the reading control section 33 through an input section 50.

The bit stream divider 10 receives the bit stream 100 and divides the bit stream 100 into main video data 150$a$, sub video data 150$b$ and audio data 150$c$. The bit stream divider 10 extracts the PTS 141 from the PES header 140 of the bit stream 100 and inserts the PTS 141 to a prescribed position of the data 150 (main video data 150$a$, sub video data 150$b$ or audio data 150$c$) which succeeds the PES header 140.

The buffer memory 20 includes a main video data storing section 20$a$ for storing main video data, a sub video data storing section 20$b$ for storing sub video data and an audio data storing section 20$c$ for storing audio data.

The bit stream divider 10, after inserting the PTS 141 into the main video data 150$a$, stores the main video data 150$a$ to which the PTS 141 has been inserted in the main video data storing section 20$a$ of the buffer memory 20 as main video data 160$a$. In the same manner, the bit stream divider 10 stores the sub video data 150b to which the PTS 141 has been inserted in the sub video data storing section 20b of the buffer memory 20 as sub video data 160b. The bit stream divider 10 also stores the audio data 150c to which the PTS 141 has been inserted in the audio data storing section 20c of the buffer memory 20 as audio data 160c. The address in the main video data storing section 20 a at which the main video data 160 a is to be stored is designated by an address signal 180a. The address in the sub video data storing section 20b at which the sub video data 160b is to be stored is designated by an address signal 180b. The address in the audio data storing section 20c at which the audio data 160c is to be stored is designated by an address signal 180c. The address signals 180a, 180b and 180c are generated by the bit stream divider 10.

Figure 5:
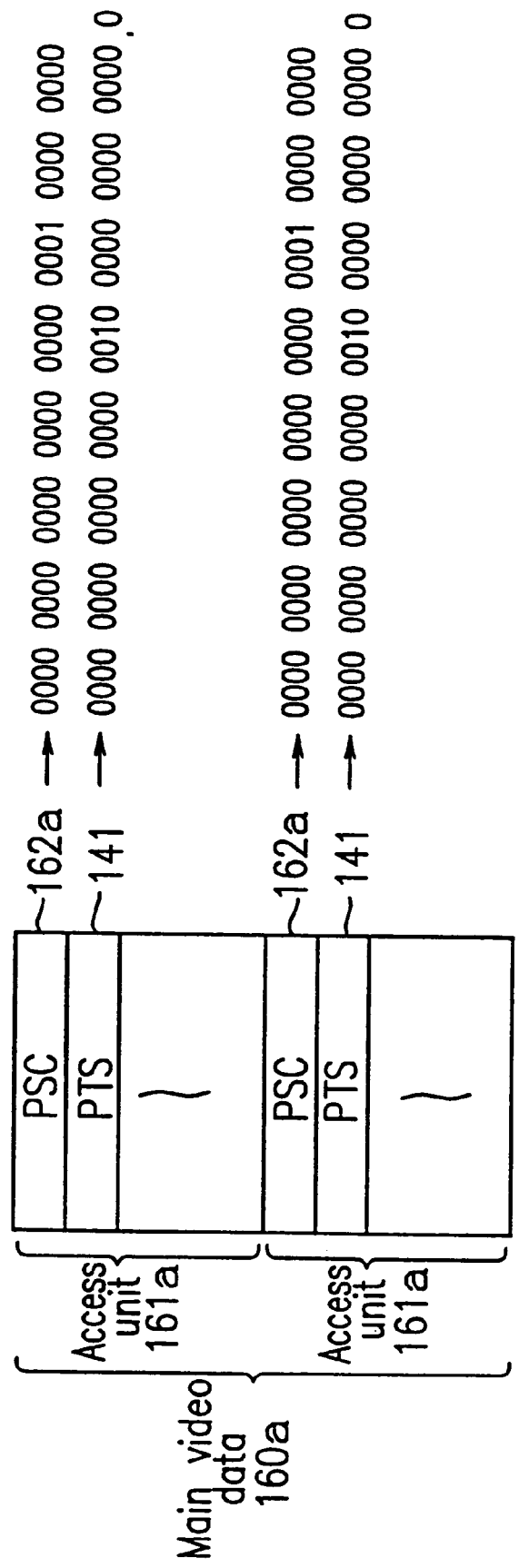
FIG. 5 shows a structure of main video data stored in a main video data storing section of a buffer memory in the decoding device shown in FIG. 2.

FIG. 5 shows the structure of the main video data 160 a stored in the main video data storing section 20a of the buffer memory 20. The main video data 160a includes one or more access units 161a. Each access unit 161a may be data corresponding to one field or data corresponding to one frame.

Each access unit 161a includes a picture start code (PSC) 162a. The PSC 162a is stored in the first word from the start of the access unit 161a. In this example, the PTS 141 is stored in the second word from the start of the access unit 161a. Needless to say, the PTS 141 can be inserted in other positions. The PTS 141 can be inserted at any position of the access unit 161a as long as the insertion of the PTS 141 is performed in conformity with a common rule to all the access units 161a.

The sub video data 160b and the audio data 160c each have substantially the same structure as that of the main video data 160a. The sub video data 160b includes one or more access units 161b. Each access unit 161b may be data corresponding to one field or data corresponding to one frame. The audio data 160c includes one or more access units 161c. One access unit 161c is the minimum unit which can be decoded into an audio signal independently. For example, in the case of a layer 1 of the MPEG1, each access unit 161c includes 384 samples.

Neither the pack headers 120 nor the PES headers 140 included in the bit stream 100 are stored in the buffer memory 20. Rather, the bit stream divider 10 extracts an SCR 121 from the pack header 120 and sends the SCR 121 to the control section 30. As described above, the bit stream divider 10 also extracts the PTS 141 from the PES header 140 of the bit stream 100 and inserts the PTS 141 to a prescribed position of each of one or more pieces of data 150 succeeding the PES header 140.

As described above, the PTS 141 which defines the timing for outputting the decoded signals is directly inserted to a prescribed position of the data 150. Thus, the decoding device 1 synchronizes the decoded signals to be output without any assistance from the CPU 360. In other words, the CPU 360 need not analyze the pack headers 120 and the PES headers 140 and maintain the correlation between the analysis results. Accordingly, the control of the relationship between the CPU 360 and the decoding device 1 is simplified and thus the load imposed on the CPU 360 is alleviated.

Also as described above, the bit stream divider 10 extracts an SCR 121, which defines the reference for the timing for outputting the decoded signals, from the pack header 120 and extracts the PTS 141, which defines the timing for outputting the decoded signals from the PES header 140. Accordingly, the pack header 120 and PES header 140 respectively including the SCR 121 and the PTS 141 need not be stored in the buffer memory 20. Thus, the amount of data stored in the buffer memory 20 is decreased. As a result, the required memory capacity for the buffer memory 20 is reduced.

Again with reference to FIG. 2, the structure of the decoding device 1 will be described.

The control section 30 includes an SCR-PTS comparison section 31, the reading control section 33 and an output control section 34.

The SCR-PTS comparison section 31 receives the SCR 121 from the bit stream divider 10 and receives the PTS 141 from the reading control section 33 as described below. Then, based on the value of the SCR 121 and the value of the PTS 141, the SCR-PTS comparison section 31 sends an output control signal which defines the timing for outputting the decoded signals to the output control section 34.

The SCR-PTS comparison section 31 includes an SCR counter 32 and comparators 31a, 31b and 31c. The SCR 121 extracted by the bit stream divider 10 is input to the SCR counter 32. The SCR counter 32 sets the value of the SCR 121 as an initial value and counts up the initial value at a frequency of 90 kHz. The counted-up value is input to the comparators 31a, 31b and 31c. The PTS 141 is extracted from the access unit which is read from the reading control section 33 as described below.

The comparator 31a compares the value from the SCR counter 32 and the PTS 141 and sends a signal indicating the comparison result to an output controller 34 a as an output control signal. For example, when the counted-up value obtained by the SCR counter 32 is smaller than the value of the PTS 141, the comparator 31a sends a low-level output control signal to the output controller 34a. Otherwise, the comparator 31a sends a high-level output control signal to the output controller 34a.

When receiving a high-level output control signal, the output controller 34a permits a main video data decoder 40a of the elementary decoding section 40 to output decoded signals. When receiving a low-level output control signal, the output controller 34a prohibits the main video data decoder 40a from outputting decoded signals.

The comparators 31b and 31c operate in the same manner as the comparator 31a, and the output controllers 34b and 34c included in the output control section 34 together with the output controller 34a operate in the same manner as the output controller 34a. Thus, descriptions of these elements will be omitted in this specification.

As described above, the timing for outputting the decoded signals from the elementary decoding section 40 is controlled in accordance with the relationship between the counted-up value obtained by the SCR counter 32 and the value of the PTS 141. Thus, the signals decoded by the elementary decoding section 40 are synchronized.

The reading control section 33 includes reading controllers 33a, 33b and 33c.

The reading controller 33a reads the main video data 160a stored in the main video data storing section 20a. Each access unit 161a is read as one unit. The reading controller 33a sends the data in the access unit 161a to the main video data decoder 40a except for a PSC 162a and the PTS 141. The reading controller 33a extracts the PTS 141 from the access unit 161a and sends the PTS 141 to the comparator 31a.

The reading controllers 33b and 33c operate in the same manner as the reading controller 33a , and thus descriptions of these elements will be omitted in this specification.

The elementary decoding section 40 includes the main video data decoder 40a, a sub video data decoder 40b and an audio data decoder 40c.

The main video data decoder 40a, the sub video data decoder 40b and the audio data decoder 40c respectively decode the data read by the reading controllers 33a, 33b and 33c in accordance with a prescribed rule. The rule to be adopted is determined by the standards used by the decoding device 1. For example, when the data stored in the buffer memory 20 is compressed, the elementary decoding section 40 expands the data. The signals decoded by the decoders 40a, 40b and 40c are respectively output from the output controllers 34a, 34b and 34c.

Figure 6:
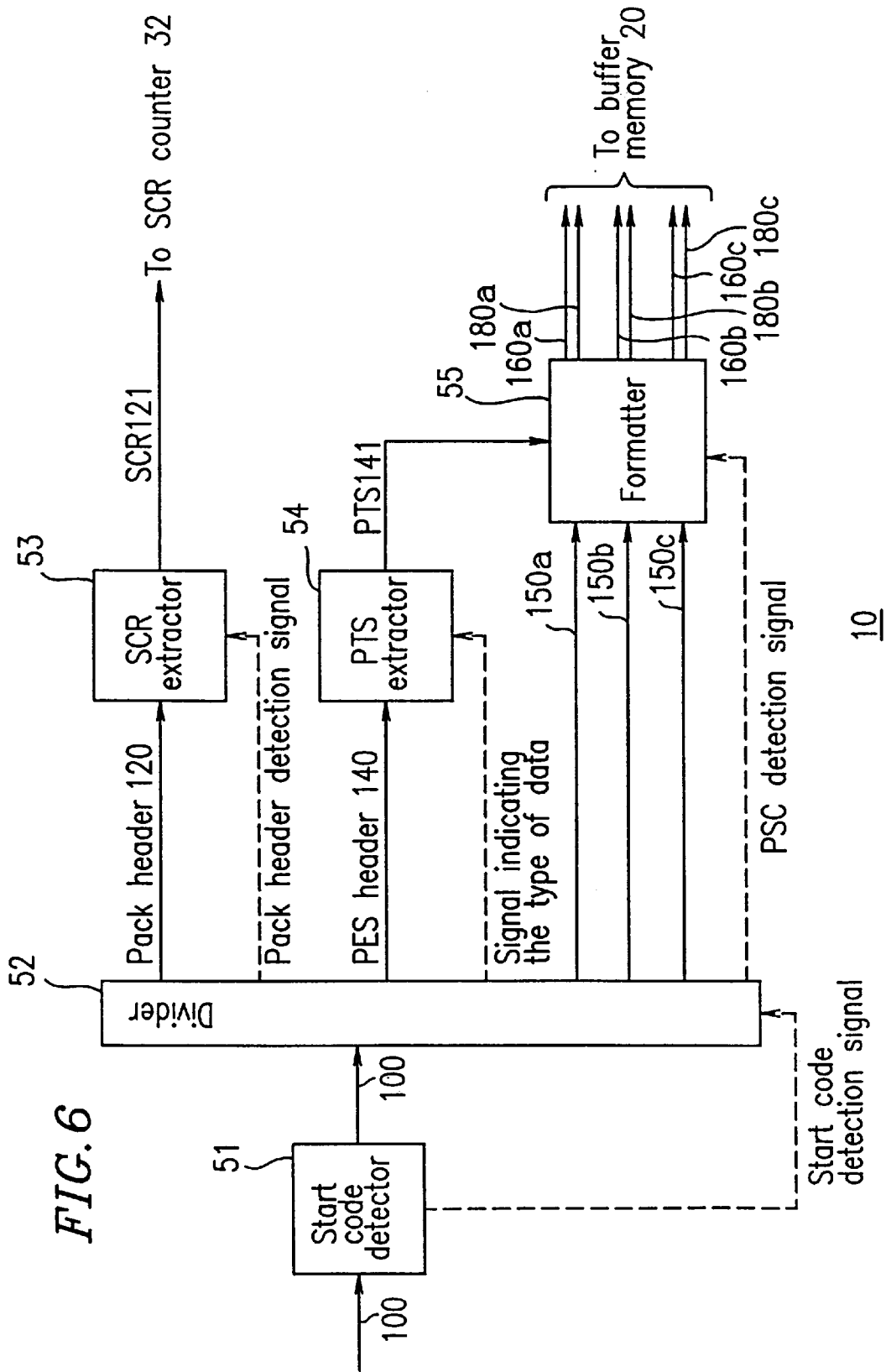
FIG. 6 is a block diagram showing a structure of a bit stream divider in the decoding device shown in FIG. 2.

FIG. 6 is a block diagram showing a structure of the bit stream divider 10.

As shown in FIG. 6, the bit stream divider 10 includes a start code detector 51, a divider 52, an SCR extractor 53, a PTS extractor 54 and a formatter 55.

The start code detector 51 detects a start code, which is located at the beginning of the pack header 120, at the beginning of the PES header 140, and at the beginning of the access unit 151a. A start code is, for example, a bit stream having 24 bits such as "0000 0000 0000 0000 0000 0001". When a start code is detected in the bit stream 100 input to the bit stream divider 10, the start code detector 51 sends a start code detection signal to the divider 52.

The divider 52 reads data having a prescribed number of bits which succeeds the start code (e.g., 8-bit data) and determines whether or not the data corresponds to a prescribed bit stream.

When the 8-bit data succeeding the start code is "1011 1010", the divider 52 determines that the data is the pack header 120 and extracts the pack header 120 from the bit stream 100. The pack header 120 is then sent to the SCR extractor 53. The SCR extractor 53 extracts the SCR 121 from the pack header 120. Such extraction is performed in accordance with, for example, the syntax shown in FIG. 4A.

When the 8-bit data succeeding the start code is "1100 XXXX", the divider 52 determines that the data is the PES header 140 corresponding to the main video data 150a and extracts the PES header 140 from the bit stream 100. The PES header 140 is then sent to the PTS extractor 54. The PTS extractor 54 extracts the PTS 141 from the PES header 140. Such extraction is performed in accordance with, for example, the syntax shown in FIG. 4B.

The main video data 150a succeeding the PES header 140 is sent to the formatter 55.

When the 8-bit data succeeding the start code is "1011 1101", the divider 52 determines that the data is the PES header 140 corresponding to the sub video data 150b and extracts the PES header 140 from the bit stream 100. The PES header 140 is then sent to the PTS extractor 54. The PTS extractor 54 extracts the PTS 141 from the PES header 140. Such extraction is performed in accordance with, for example, the syntax shown in FIG. 4B.

The sub video data 150b succeeding the PES header 140 is sent to the formatter 55.

When the 8-bit data succeeding the start code is "1100 XXXX", the divider 52 determines that the data is the PES header 140 corresponding to the audio data 150c and extracts the PES header 140 from the bit stream 100. The PES header 140 is then sent to the PTS extractor 54. The PTS extractor 54 extracts the PTS 141 from the PES header 140. Such extraction is performed in accordance with, for example, the syntax shown in FIG. 4B.

The audio data 150c succeeding the PES header 140 is sent to the formatter 55.

When the 8-bit data succeeding the start code is "0000 0000", the divider 52 determines that the data is the PSC 162a and sends a PSC detection signal to the formatter 55.

In response to the PSC detection signal, the formatter 55 inserts the PTSs 141 output from the PTS extractor 54 to prescribed positions of the main video data 150a, the sub video data 150b and the audio data 150c. As a result, the formatter 55 outputs main video data 160a, the sub video data 160b and the audio data 160c each including the PTS 141. The formatter 55 also outputs the address signals 180a, 180b and 180c.

Figure 7:
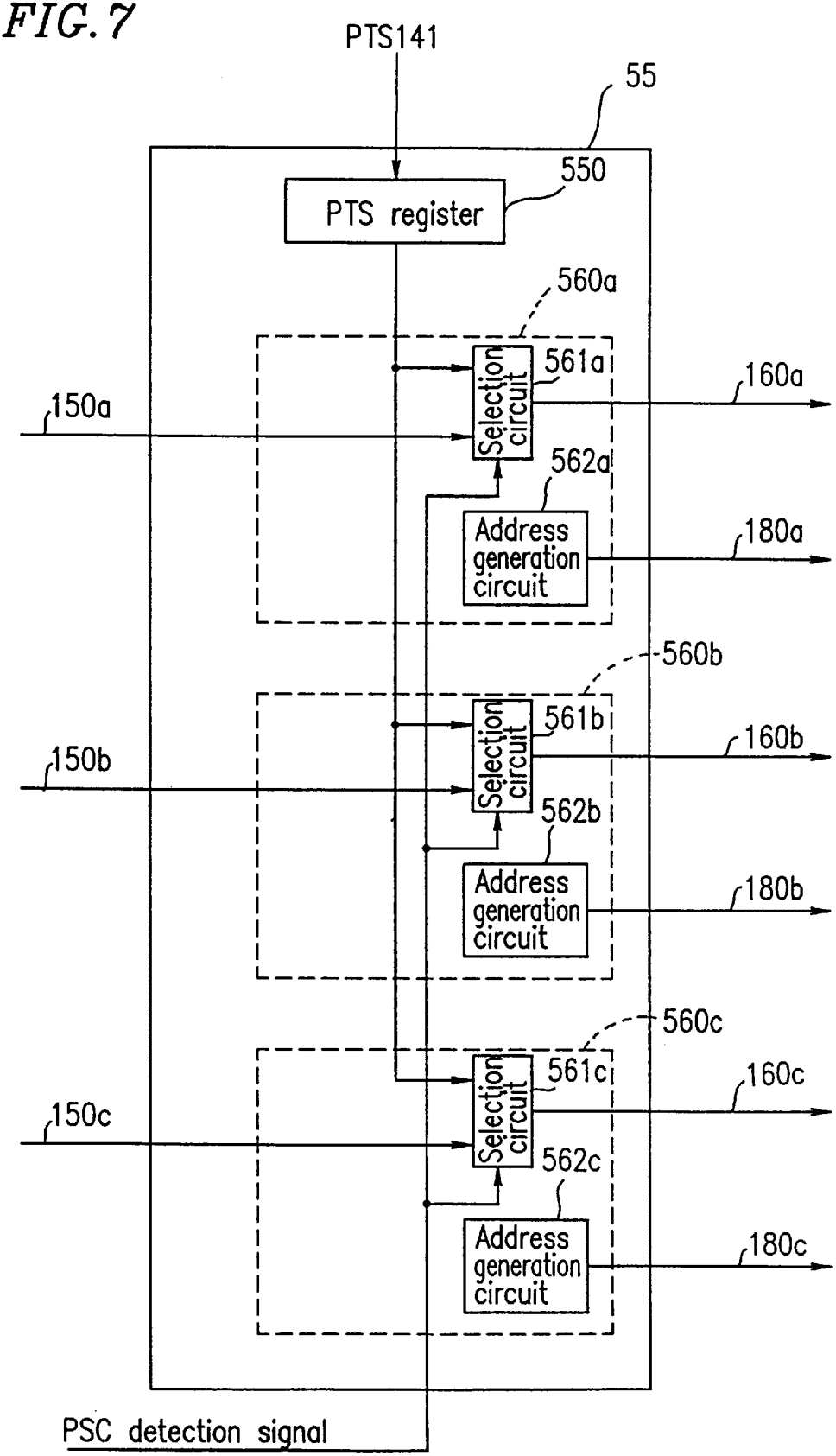
FIG. 7 shows a structure of a formatter in the decoding device shown in FIG. 2.

FIG. 7 shows a structure of the formatter 55. The formatter 55 includes a PTS register 550, a main video data formatting section 560a, a sub video data formatting section 560b and an audio data formatting section 560c.

The PTS register 550 stores the PTS 141 extracted by the PTS extractor 54.

The main video data formatting section 560a includes a selection circuit 561a and an address generation circuit 562a.

To the selection circuit 561a, the main video data 150a is input word by word. When the PSC detection signal has a low level, the selection circuit 561a selectively outputs respective words of the main video data 150a. In response to a change of the PSC detection signal from a low level to a high level, the selection circuit 561a selectively outputs the PTS 141 stored in the PTS register 550 as opposed to a word from the main video data 150a. In this manner, the PTS 141 is inserted to the word position next to the PSC 162a. Alternatively, the PTS 141 can be inserted to a position which is a prescribed number of words away from the PSC 162a. The prescribed number of words can be counted by the selection circuit 561a based on, for example, a clock signal (not shown).

The address generation circuit 562a generates the address signal 180a which indicates the position in the main video data storing section 20a at which the main video data 160a including the PTS 141 is stored.

The sub video data formatting section 560b and the audio data formatting section 560c have the same structure and operate in the same manner as the main video data formatting section 560a, and thus descriptions of these elements will be omitted in this specification.

EXAMPLE 2

Figure 8:
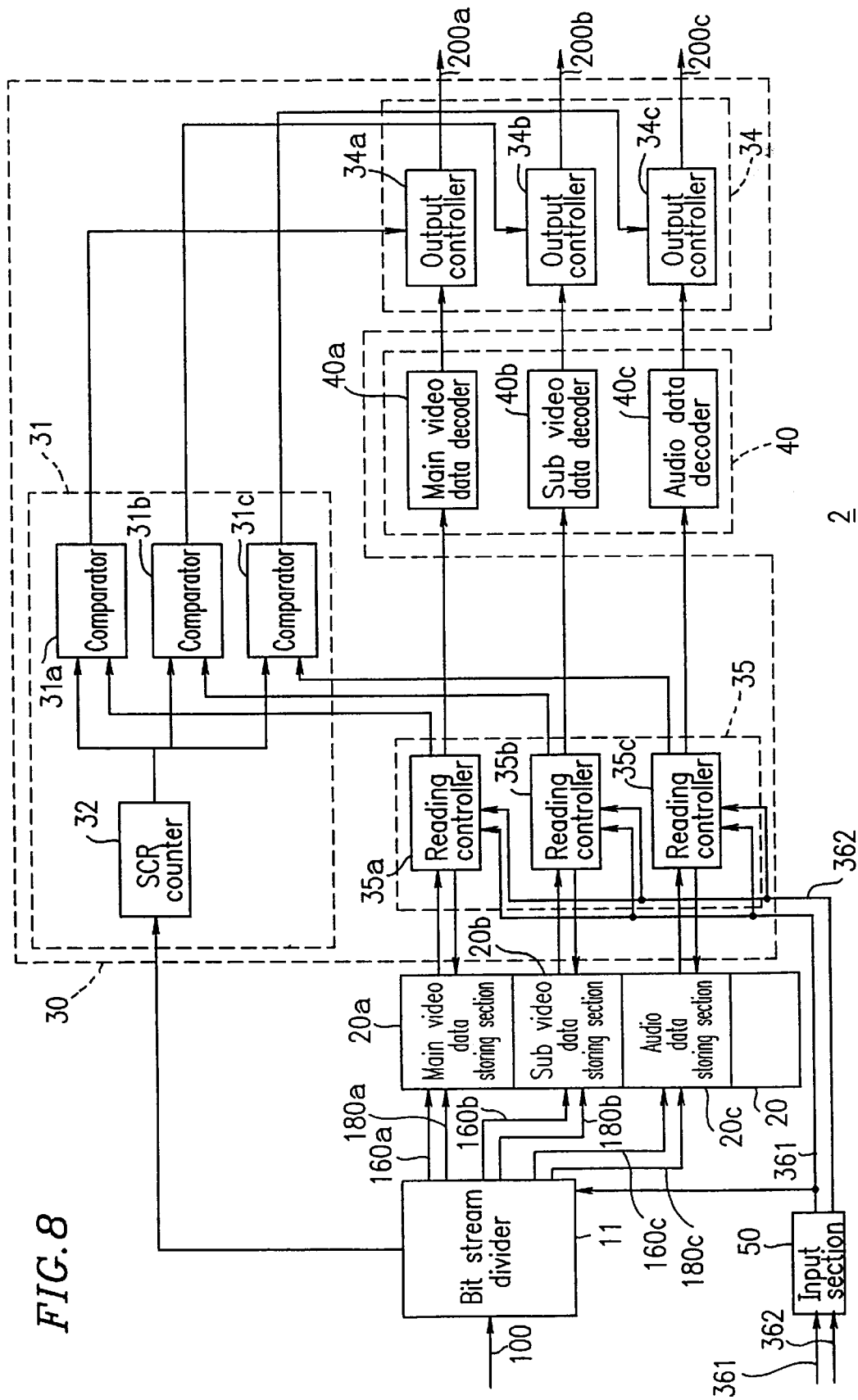
FIG. 8 is a circuit diagram illustrating a structure of a decoding device according to a second example of the present invention.

FIG. 8 is a circuit diagram illustrating a structure of a decoding device 2 according to a second example of the present invention. The structure of the decoding device 2 is identical with that of the decoding device 1 according to the first example except for a bit stream divider 11 and a reading control section 35. Identical elements previously discussed in Example 1 will bear identical reference numerals therewith and the descriptions thereof will be omitted.

The bit stream divider 11 receives the bit stream 100 and divides the bit stream 100 into main video data 150a, sub video data 150b and audio data 150c. The bit stream divider 11 extracts a PTS 141 from the PES header 140 of the bit stream 100 and inserts the PTS 141 to a prescribed position of the data 150 (main video data 150a, sub video data 150b or audio data 150c) which succeeds the PES header 140. In addition, the bit stream divider 11 inserts an address pointer 171 to a prescribed position of the data 150.

Figure 9:
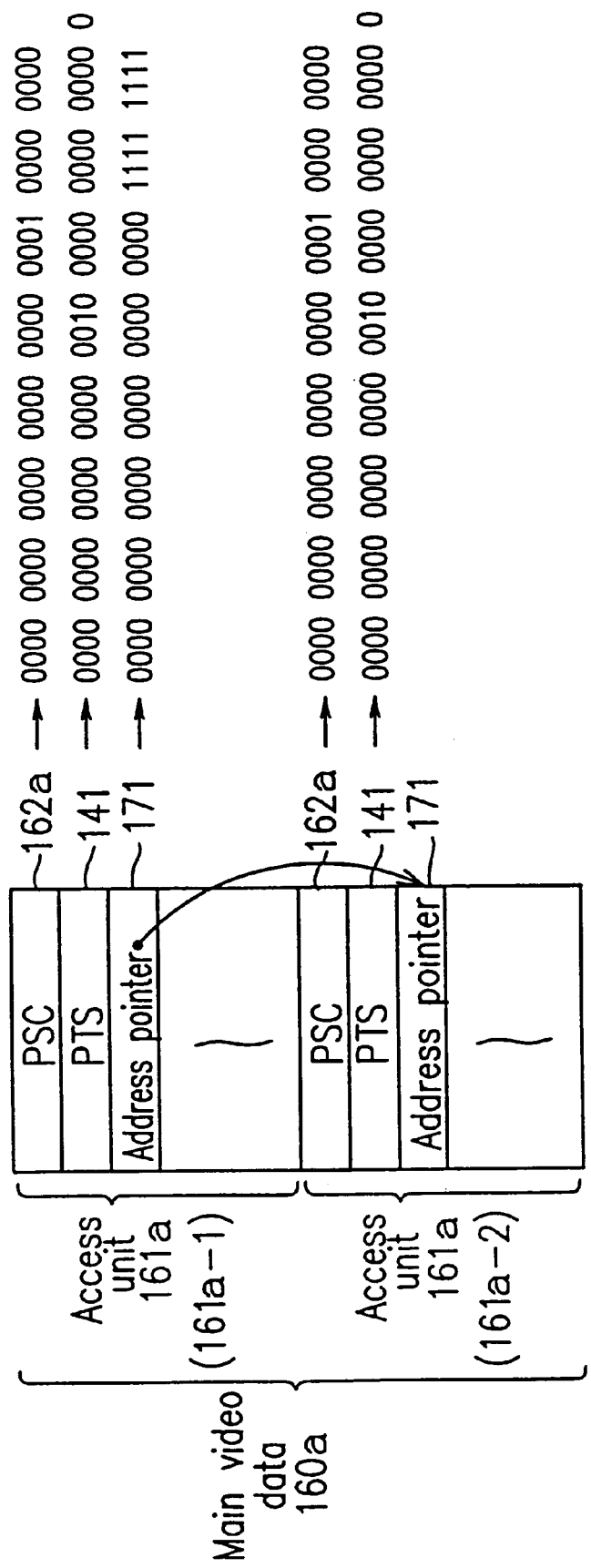
FIG. 9 shows a structure of main video data stored in a main video data storing section of a buffer memory in the decoding device shown in FIG. 8.

FIG. 9 shows the structure of the main video data 160a which is stored in the main video data storing section 20a of the buffer memory 20 by the bit stream divider 11. In the example shown in FIG. 9, the address pointer 171 is inserted in the third word from the start of each access unit 161a. Needless to say, the address pointer 171 can be inserted in other positions. The address pointer 171 can be inserted at any position of the access unit 161a as long as the insertion of the address pointer 171 is performed in conformity with a common rule to all the access units 161a.

The value of the address pointer 171 indicates the address of another address pointer 171 in the access unit 161a stored in the buffer memory 20, the value being counted along the time axis. Referring to the example shown in FIG. 9, in the case where it is assumed that an access unit 161a-2 is stored in the buffer memory 20 immediately after an access unit 161a-1 and that the address of the address pointer 171 of the access unit 161a-2 is 255 words after the address of the address pointer 171 of the access unit 161a-1, the value of the address pointer 171 of the access unit 161a-1 is set to be 255.

Thus, a pointer chain is formed from the access unit 161a-1 toward the access unit 161a-2 as indicated by the arrow in FIG. 9.

The formation of the pointer chain is achieved in, for example, the following manner.

The address A1 of the address pointer 171 of the access unit 161a-1 is saved, and the address A2 of the address pointer 171 of the access unit 161a-2 is obtained. Then, the address A2 is stored at the position designated by the address A1. The address A2 can be a relative address with respect to the address A1. Such a relative address can be obtained by, for example, counting the amount of data which passes through the formatter 55 (FIG. 6) between the receipt of one PSC detection signal and the receipt of the next PSC detection signal.

Figure 10:
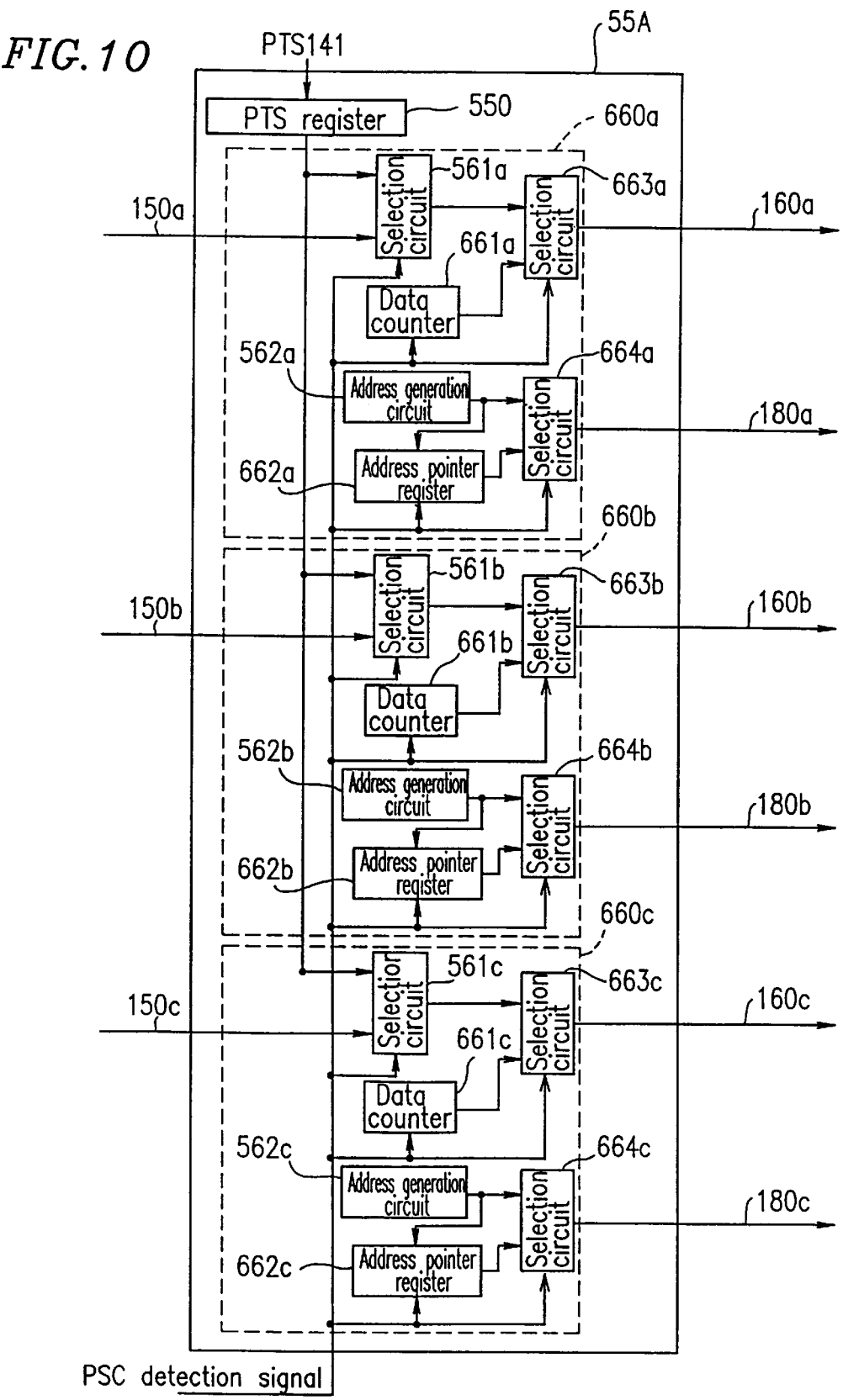
FIG. 10 shows a structure of a formatter in the decoding device shown in FIG. 8.

FIG. 10 shows a structure of a formatter 55A. The formatter 55A is used in place of the formatter 55 in order to allow for insertion of the address pointer 171 at a prescribed position of the data 150.

The formatter 55A includes a PTS register 550, a main video data formatting section 660a, a sub video data formatting section 660b and an audio data formatting section 660c.

The PTS register 550 stores the PTS 141 extracted by the PTS extractor 54.

The main video data formatting section 660a includes a data counter 661a, an address pointer register 662a, a selection circuit 663a and another selection circuit 664a, in addition to the elements shown in FIG. 7.

The data counter 661a, the address pointer register 662a and the selection circuits 663a and 664a are adapted to perform prescribed operations in response to two successive PSC detection signals. Hereinafter, among the two successive PSC detection signals, the first signal will be referred to as "detection signal S1" and the second signal will be referred to as "detection signal S2". The prescribed operations are shown in Table 1.

TABLE 1

|  | Detection signal S1: Low→High | Detection signal S2: Low→High |
| --- | --- | --- |
| Data counter 661a | Reset count value; start counting | Ignore |
| Address | Store address | Ignore |

TABLE 1-continued

|  | Detection signal S1: Low→High | Detection signal S2: Low→High |
| --- | --- | --- |
| pointer register 662a | generated by address generation circuit 562a |  |
| Selection circuit 663a | Ignore | Select output from data counter 661a |
| Selection circuit 664a | Ignore | Select output from address pointer register 662a |

In response to the level change of the detection signal S1 from the low level to the high level, the address pointer register 662a stores the address generated by the address generation circuit 562a. This is performed to save the address A1 of the address pointer 171 of the access unit 161a-1 (see FIG. 9).

In response to the level change of the detection signal S1 from the low level to the high level, the data counter 661a resets the count value and starts counting. This is performed to count the number of words of the main video data 150a which pass through the formatter 55A between the receipt of one PSC detection signal and the receipt of the next PSC detection signal.

In response to the level change of the detection signal S2 from the low level to the high level, the selection circuit 663a selectively outputs the value counted by the data counter 661a. Thus, an offset value which indicates the relative position of the address pointer 171 of the access unit 161a-2 with respect to the address pointer 171 of the access unit 161a-1 (see FIG. 9) is output as an output from the selection circuit 663a.

In response to the level change of the detection signal S2 from the low level to the high level, the selection circuit 664a selectively outputs the address stored in the address pointer register 662a. Thus, the relative address A2 of the address pointer 171 of the access unit 161a-2 is stored at the position designated by the address A1 of the address pointer 171 of the access unit 161a-1 (see FIG. 9).

The sub video data formatting section 660b and the audio data formatting section 660c have the same structure and operate in the same manner as the main video data formatting section 660a, and the descriptions of these elements will be omitted in this specification.

The sub video data 160b and the audio data 160c have the same structure as that of the main video data 160a, and thus descriptions of these elements will be omitted in this specification.

As described in Example 1, neither the pack headers 120 nor the PES headers 140 included in the bit stream 100 are stored in the buffer memory 20. Rather, the bit stream divider 11 extracts an SCR 121 from the pack header 120 and sends the SCR 121 to the control section 30. The bit stream divider 11 also extracts the PTS 141 from the PES header 140 of the bit stream 100 and inserts the PTS 141 to a prescribed position of each of one more pieces of data 150 succeeding the PES header 140. In addition, the bit stream divider 11 inserts an address pointer 171 to a prescribed position of each of one or more pieces of data 150.

As described above, the PTS 141 and the address pointer 171 which define the timing for outputting decoded signals is directly inserted to a prescribed position of the data 150. Thus, the decoding device 2 synchronizes the timing for outputting the decoded signals without any assistance from the CPU 360. In other words, the CPU 360 need not analyze the pack headers 120 and the PES headers 140 and maintain the correlation between the analysis results. Accordingly, the control of the relationship between the CPU 360 and the decoding device 2 is simplified and thus the load imposed on the CPU 360 is alleviated.

Also as described above, the bit stream divider 11 extracts the SCR 121, which defines the reference for the timing for outputting the decoded signals, from the pack header 120 and extracts the PTS 141, which defines the timing for outputting the decoded signals from the PES header 140. Accordingly, the pack header 120 and PES header 140 respectively including the SCR 121 and the PTS 141 need not be stored in the buffer memory 20. Thus, the amount of data stored in the buffer memory 20 is decreased. As a result, the required memory capacity for the buffer memory 20 is reduced.

Returning to FIG. 8, the reading control section 35 will be described.

The reading control section 35 executes a special reproduction operation and signal synchronization, utilizing the address pointer 171, in addition to the operations performed also by the reading control section 33.

The reading control section 35 includes reading controllers 35a, 35b and 35c. Hereinafter, the reading controller 35a will be described as an example. The reading controllers 35b and 35c operate in the same manner as the reading controller 35a and descriptions thereof will be omitted.

First, the reproduction operation performed by the reading controller 35a will be described.

The reading controller 35a operates in accordance with the control signal 362 which is input through the input section 50. When the control signal 362 indicates the "normal reproduction mode", the reading controller 35a operates as described in Example 1. Namely, the reading controller 35a reads the main video data 160a stored in the main video data storing section 20a. Each access unit 161a is read as one unit. The reading controller 33a sends the data in the access unit 161a to the main video data decoder 40a except for a PSC 162a and the PTS 141. The reading controller 35a extracts the PTS 141 from the access unit 161a and sends the PTS 141 to the comparator 31a.

When the control signal 362 indicates "double-speed reproduction mode", the reading controller 35a, prior to reading the access unit 161a of the main video data 160a stored in the main video data storing section 20a, reads the address pointer 171 of the access unit 161a. As described above, the address pointer 171 stores an address A2 of an address pointer 171 of another access unit 161a which is located later along the time axis. Instead of reading the data succeeding the address pointer 171 which has been read, the reading controller 35a reads the data succeeding the address pointer 171 located in the address A2 designated by the address pointer 171 which has been read. This means that one of every two access units 161a is skipped without being read. In this manner, the reading controller 35a performs double-speed reproduction.

Figure 11:
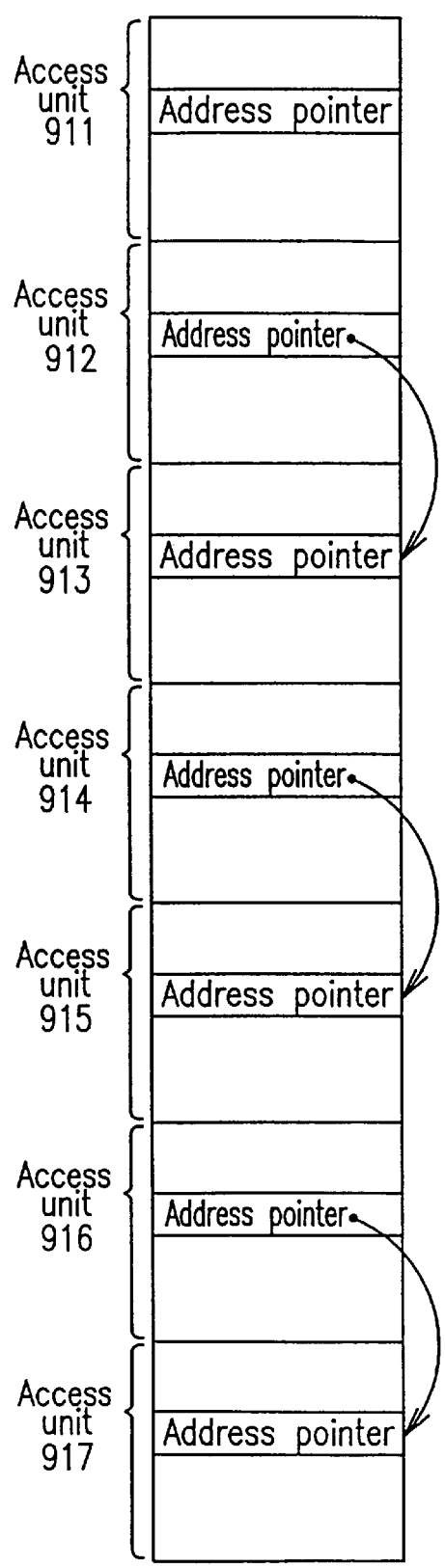
FIG. 11 shows a structure of data stored in a data storing section of the buffer memory in the decoding device shown in FIG. 8 to illustrate the manner in which double-speed reproduction is performed.

FIG. 11 illustrates how double-speed reproduction is performed.

In the "normal reproduction mode", the reading controller 35a reads access units 911 through 917 sequentially. In the "double-speed reproduction mode", the reading controller 35a sequentially reads only the access units 911, 913, 915 and 917, and skips reading the access units 912, 914, and 916.

When the control signal 362 indicates the "freeze reproduction mode", the reading controller 35a repeatedly reads the data succeeding the address pointer 171. Thus, the same access unit is reproduced in repetition.

Figure 12:
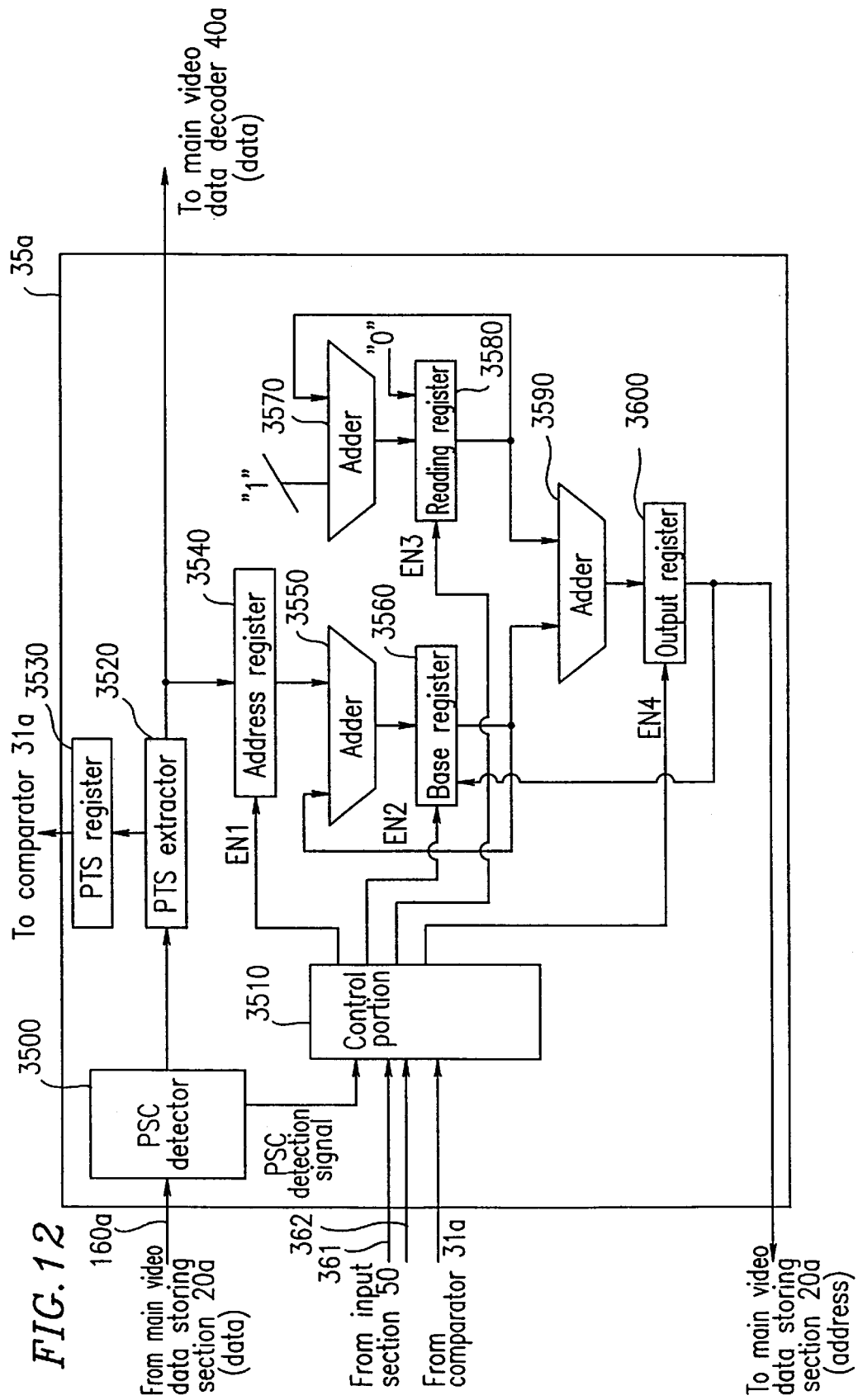
FIG. 12 is a block diagram of a reading controller in the decoding device shown in FIG. 8.

FIG. 12 is a block diagram of the reading controller 35a. The reading controller 35a outputs an address, which indicates the position to be accessed of the main video data storing section 20a, to the main video data storing section 20a, and receives the main video data 160a corresponding to the address from the main video data storing section 20a.

The reading controller 35a includes a PSC detector 3500, a PTS extractor 3520 and a PTS register 3530.

The PSC detector 3500 detects a PSC 162a included in the access unit 161a and outputs a PSC detection signal.

The PTS extractor 3520 extracts the PTS 141 included in the access unit 161a and stores the PTS 141 in the PTS register 3530. The output of the PTS register 3530 is connected to the comparator 31a. The PTS extractor 3520 sends data in the access unit 161a to the main video data decoder 40a except for the PSC 162a and the PTS 141.

The reading controller 35a further includes a control portion 3510. The control portion 3510 receives the control signals 361 and 362 which are input through the input section 50, the output from the comparator 31a, and the PSC detection signal. The control portion 3510 generates enable signals EN1 through EN4 in accordance with these input signals. (1) The reading controller 35a operates in the following manner in the "normal reproduction mode".

The control portion 3510 maintains the enable signals EN1 through EN4 inactive.

The value stored in a reading register 3580 is initialized to zero in response to the PSC detection signal.

The control portion 3510 activates the enable signal EN3 each time one word of the access unit 161a is read. As a result, the output from an adder 3570 is incremented one by one and stored in the reading register 3580.

The value stored in a base register 3560 is initialized to the value stored in an output register 3600 in response to the PSC detection signal.

Another adder 3590 adds the output from the base register 3560 and the output from the reading register 3580.

The control portion 3510 activates the enable signal EN4 each time one word of the access unit 161a is read. As a result, the output from the adder 3590 is stored in the output register 3600. The output from the output register 3600 is sent to the main video data storing section 20a as an address. (2) The reading controller 35a operates in the following manner in the "double-speed reproduction mode".

The control portion 3510 activates the enable signal EN1 in response to the PSC detection signal. As a result, the value of the address pointer 171 of the access unit 161a-1 is stored in an address register 3540.

An adder 3550 adds the output from the base register 3560 and the output from the address register 3540.

The control portion 3510 activates the enable signal EN2 in response to the PSC detection signal. As a result, the output from the adder 3550 is stored in the base register 3560. This means that the value stored in the base register 3560 is increased compared with the value stored therein in the case of "normal reproduction mode" by the value of the address pointer 171 stored in the address register 3540.

As in the case of the "normal reproduction mode", the output from the base register 3560 and the output from the reading register 3580 are added together by the adder 3590, and the sum is stored in the output register 3600. The output register 3600 outputs the address of the address pointer 171 of the access unit 161a-2 instead of the address of the address pointer 171 of the access unit 161a-1. (3) The reading controller 35a operates in the following manner in the "freeze reproduction mode".

The value stored in the base register 3560 is maintained without being initialized to the value stored in the output register 3600 in response to the PSC detection signal. The other procedures are the same as in the case of the "normal reproduction mode". Thus, data in the same access unit 161a is sent to the main video data decoder 40a in repetition.

Next, the synchronization performed by the reading controller 35a utilizing the address pointer 171 will be described.

In the second example, the output from the comparator 31a of the SCR-PTS comparison section 31 is input to the reading controller 35a. As described above, the output from the comparator 31a indicates the comparison result of the value obtained by counting up the value of the SCR 121 and the value of the PTS 141.

The timing for comparing the above values is determined, for example, as follows. A signal for defining such timing can be generated inside the comparators 31a through 31c or supplied from outside the comparators 31a through 31c.

<Timing for comparison>

For video data, frame timing: 33 ms (NTSC)

frame timing: 25 ms (PAL)

For audio data, every 384 samples (MPEG1, layer 1)

every 1152 samples (MPEG1, layer 2).

When the value obtained by counting up the value of the SCR 121 is larger than the value of the PTS 141, the time to output a signal 200a corresponding to the access unit 161a having the above-mentioned PTS 141 has already passed. When the output from the comparator 31a indicates that the "value obtained by counting up the value of the SCR 121 is larger than the value of the PTS 141", the reading controller 35a executes the same operation as in the case of the "double-speed reproduction". Such an operation is achieved when the reading controller 35a skips the reading of the access unit 161a at a prescribed rate. Thus, the disadvantages resulting from delay in outputting the signal 200a from the output controller 34a is made up for.

When the value obtained by counting up the value of the SCR 121 is smaller than the value of the PTS 141, the time to output a signal 200a corresponding to the access unit 161a having the above-mentioned PTS 141 has not yet arrived. When the output from the comparator 31a indicates that the "value obtained by counting up the value of the SCR 121 is smaller than the value of the PTS 141", the reading controller 35a executes the same operation as in the case of the "freeze reproduction". Such an operation is achieved when the reading controller 35a repeatedly reads the data succeeding the address pointer 171 which has been read. Thus, the timing for outputting the signal 200a from the output controller 34a is adjusted while outputting the data in the same access unit 161a an arbitrary number of times.

In Example 2, special reproduction and signal synchronization are realized by inserting the address pointer 171 at a prescribed position of the access unit 161a.

A decoding device according to the present invention can be realized by software. Those skilled in the art would easily understand that the function and operation of the decoding devices 1 and 2 shown in FIGS. 2 and 8 can be realized by software using a microcomputer including an I/O port for receiving a bit stream, an external memory controller and a timer.

According to the present invention, first timing information which defines the timing for outputting decoded signals is inserted to a prescribed position of the data. Thus, the decoding device synchronizes the timing for outputting the decoded signals without any assistance from the CPU. As a result, the load imposed on the CPU is alleviated.

The decoding device extracts the first timing information from the header, and therefore the header including the first timing information need not be stored in the buffer memory. Thus, the amount of data stored in the buffer memory is decreased. As a result, the required memory capacity for the buffer memory is reduced.

In the case where an address pointer is inserted to a prescribed position of the data, special reproduction and signal synchronization are performed more easily.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A decoding device for decoding a bit stream and outputting a decoded signal, the decoding device comprising:

a divider for dividing the bit stream into a header and data;

an extractor for extracting first timing information, which defines timing for outputting the decoded signal, from the header;

a formatter for inserting the first timing information to a prescribed position of the data;

a decoder for decoding the data to generate the decoded signal; and an output controller for controlling timing for outputting the decoded signal based on second timing information which defines a reference for the timing for outputting the decoded signal and the first timing information inserted at the prescribed position of the data, wherein the data includes a plurality of data portions, and the formatter inserts an address pointer to a prescribed position of the data, the address pointer linking one of the plurality of data portions and another of the plurality of data portions in an addressable form.

2. A decoding device according to claim 1, wherein the formatter includes:

a first selection circuit for selecting one of each of the plurality of data portions or the first timing information in response to a first detection signal which specifies a prescribed data portion among the plurality of data portions, a counter for counting an amount of data which passes through the formatter between the receipt of the first detection signal and the receipt of a second detection signal immediately after the first detection signal, and a second selection circuit for selecting one of an output from the first selection circuit or an output from the counter in response to the second detection signal.

3. A decoding device according to claim 1, further comprising a reading control section for controlling reading of the data so as to skip at least a part of the plurality of data portions by referring to the address pointer in response to a control signal.

4. A decoding device according to claim 1, further comprising a reading control section for controlling reading of the data so as to skip at least a part of the plurality of data portions by referring to the address pointer in accordance with a comparison result of the first timing information and the second timing information.

* * * * *